United States Patent [19]

Blom

[11] Patent Number: 4,882,068

[45] Date of Patent: Nov. 21, 1989

[54] METHOD AND APPARATUS FOR REMOVING LIQUID FROM SUSPENSIONS

[75] Inventor: Kari B. Blom, Fort Lauderdale, Fla.

[73] Assignee: Parkson Corporation, Fort Lauderdale, Fla.

[21] Appl. No.: 189,139

[22] Filed: May 2, 1988

[51] Int. Cl.$^4$ .......................................... B01D 21/02
[52] U.S. Cl. .................................. 210/703; 209/170; 210/221.2
[58] Field of Search ................... 209/170; 210/221.1, 210/221.2, 703–705

[56] References Cited

U.S. PATENT DOCUMENTS

| | | | |
|---|---|---|---|
| 1,056,548 | 3/1913 | Imhoff | 210/703 |
| 1,376,459 | 5/1921 | Pedersen | 210/703 |
| 3,479,281 | 11/1969 | Kikindai et al. | 210/703 |
| 3,637,490 | 7/1970 | Gardner et al. | 210/705 |
| 3,679,056 | 7/1972 | Haymore | 210/221.1 |
| 3,822,015 | 7/1974 | Hsieh et al. | 210/221.2 X |
| 4,045,243 | 8/1977 | Wohl et al. | 209/170 X |
| 4,176,058 | 11/1979 | Grobler | 210/705 X |
| 4,289,628 | 9/1981 | Disselbeck et al. | 210/703 |
| 4,340,487 | 7/1982 | Lyon | 210/705 |
| 4,468,320 | 8/1984 | Schmidt | 210/221.2 X |

Primary Examiner—Charles Hart
Attorney, Agent, or Firm—Brumbaugh, Graves, Donohue & Raymond

[57] ABSTRACT

In the representative liquid removal system described in the specification, a suspension of solid particles in a liquid received, for example, from a gravity separator, is directed to a tank having an upwardly inclined moving screen forming one wall and gas bubbles or gas-saturated liquid are injected into the suspension at the inlet. As a result, the liquid removed through the screen in the lower portion of the tank carries fewer solid particles onto the screen, preventing the screen from becoming blocked and thereby inhibiting liquid removal.

11 Claims, 1 Drawing Sheet

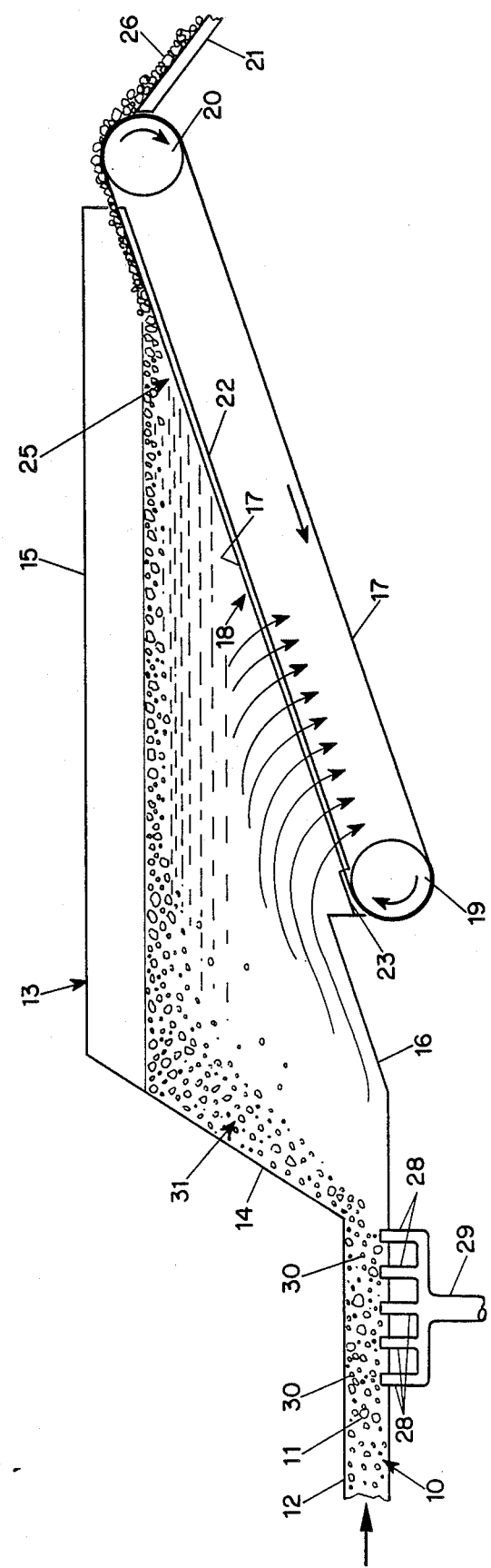

METHOD AND APPARATUS FOR REMOVING LIQUID FROM SUSPENSIONS

BACKGROUND OF THE INVENTION

This invention relates to removal of liquid from suspensions and, more particularly, to a new and improved liquid removal system which provides more efficient and effective liquid removal.

In many conventional systems for separating suspended solids from a liquid, the treatment is carried out in three stages. In the first stage, the suspension is supplied to a settling device where gravity separation of suspended material from the liquid occurs over a period of time. Such gravity separation may be enhanced by flocculation or coagulation of the suspended material to collect fine particles into larger aggregates and by introduction of air or gas bubbles to enhance the gravity separation process. Such arrangements are described, for example, in U.S. Pat. Nos. 1,056,548, 1,376,459, 4,289,628 and 4,340,487.

In the second stage, the suspended material received from the gravity settler, which may have a total solids content of 1% or 2%, for example, is applied to the porous surface of a moving belt, screen or drum, through which liquid is drained to produce a layer of material having a substantially higher solids content, such as about 4% to 10%. In the third stage, the second stage output is squeezed in a filter press, belt filter press, or other dewatering device to remove most of the remaining liquid, producing a filter cake having, for example, about 20% to 50% solids content.

In apparatus for removing suspended material from a suspension having about 1% to 10% solids content, such as, for example, the apparatus used for the second stage of the above-described process, in which the suspension is applied to a porous surface to drain the liquid from the solid material, the porous surface often becomes clogged with the solid material from the suspension, thus inhibiting drainage and trapping liquid in and above the layer of solid material. As a result, the material removed from the porous surface and supplied to a filter press has a relatively high content of liquid which must be removed in the filter press. Although some gravity separators providing gaseous flotation, such as those described in Pat. Nos. 3,479,281 and 3,637,490, have included porous belts for conveying a low-solids-content scum or sludge from the upper level of a liquid-solids mixture in a gravity separator to a discharge point, such arrangements do not provide adequate drainage of the liquid carried by the sludge.

SUMMARY OF THE INVENTION

Accordingly, it is an object of the invention to provide a new and improved method and apparatus for removing liquid from a suspension.

Another object of the invention is to provide an arrangement for withdrawing liquid from a suspension through a porous surface moving through the suspension in which enhanced removal of liquid in a solids separation process is effected.

These and other objects of the invention are attained by supplying a suspension to a porous moving member for drainage of liquid from the suspension and producing bubbles in the suspension before it is supplied to the porous member to inhibit accumulation of solid material on the adjacent portion of the porous member. Apparatus in accordance with the invention includes a tank to which suspension is supplied having a wall portion formed by a movable, porous surface through which liquid may be withdrawn from the suspension and which carries the remaining higher-solids-content material to a discharge, and a bubble generator in the intake region of the tank for injecting bubbles into the suspension introduced into the tank to inhibit the accumulation of the solids on the adjacent portion of the movable porous surface.

BRIEF DESCRIPTION OF THE DRAWING

Further objects and advantages of the invention will be apparent from a reading of the following description in conjunction with the accompanying drawing which is a schematic sectional view illustrating the arrangement of a representative embodiment of an apparatus for liquid removal from a suspension arranged in accordance with the invention.

DESCRIPTION OF PREFERRED EMBODIMENT

In a typical embodiment of the invention illustrated schematically in the accompanying drawing, a suspension 10 containing solid particles 11 received, for example, from a first stage gravity settler and having a solids content of about 1% or 2%, for example, is supplied to the inlet 12 of a tank 13. The tank 13 includes an end wall 14 and side walls 15, only one of which is visible in the sectional view shown in the drawing, and a bottom wall 16 arranged so that the inlet 12 introduces the suspension near the bottom of the tank. To complete the tank, an inclined, porous belt 17 made, for example, of porous screen material, is mounted adjacent to an opening 18 extending in an inclined direction from the bottom wall 16 of the tank to the upper end of the tank so as to form an end wall of the tank opposite the end wall 14.

The belt 17 is supported at opposite ends by two drums or rollers 19 and 20, which drive the portion of the belt 17 adjacent to the interior of the tank in the upward direction from the bottom of the tank toward the upper end. At the side of the upper roller 20 away from the tank, a discharge chute 21 removes solid material from the belt 17 as it passes around the drum and conveys it to a filter press (not shown) which may comprise, for example, the third stage of a solids separation process.

In order to remove liquid from the suspension within the tank 13 without substantial leakage, the side walls 15 are provided with an inwardly projecting lip 22 which extends beneath the edge of the porous belt 17 to support the belt and prevent leakage of suspension around the sides of the belt. In addition, the bottom wall 16 may be provided with a flexible lip 23 positioned above the drum 19 for the same purpose.

A suspension 10 supplied through the inlet 12 from a gravity settler or the like will normally fill the tank 13 with a homogeneous distribution of the solid particles. Consequently, liquid passing through the porous belt 17 at the lower portion immediately following passage of the belt around the drum 19 as indicated by the arrows 24 will carry with it a substantial volume of suspended solid particles which are deposited on the screen 17 in that region. The resulting layer of solid material inhibits or prevents further passage of liquid through the porous belt as it moves toward the upper region 25, thereby substantially reducing the drainage of liquid through the belt from the suspension. Accordingly, the layer of solid particles 26 which is carried by the belt around the drum 20 and deposited on the chute 21 has a relatively low solids content because it contains a substantial volume of liquid which was unable to pass through the belt 17.

In accordance with the invention, this problem is overcome by producing bubbles in the suspension supplied to the tank to cause the solid particles 11 in the suspension to rise in the tank 13 away from the adjacent portion 24 of the porous belt 17. For this purpose, the illustrated embodiment of the invention includes a series of injection nozzles 28 in the inlet portion 12 of the tank. These nozzles are connected to a manifold 29 from which they are supplied with air or other gas or with a liquid saturated with gas under pressure, producing fine gas bubbles 30 in the inlet portion of the apparatus.

With this arrangement, bubbles become attached to the solid particles in the suspension, making the particles more buoyant and causing them to rise in the immediately adjacent portion 31 of the tank 13 before the suspension reaches the belt 17, thereby permitting liquid to pass through the belt in the adjacent region 24 without depositing a significant quantity of suspended particles on the belt and blocking the openings in the screen. Consequently, more liquid can be withdrawn from the suspension than would be possible in the absence of the gas bubbles and, as a result, the solid particles which are deposited as the belt 17 moves through the more remote upper region of the tank and which are carried around the drum 20 to the discharge chute having higher solids content, making it easier for a filter press or other dewatering device to complete the removal of liquid.

In the operation of a representative liquid removal system according to the invention, the air injected by the nozzles 28 is preferably supplied at a pressure in the range of about 40–80 psi and in a volume corresponding to about 20% to 100% of the volume of suspension passing into the inlet 12. Preferably, when the solid particles 11 in the suspension are relatively large, as in primary/biological sludges, the air bubbles provided at the inlets 28 are in the range of about 500–3,000 microns and, if the solid particles are smaller, air bubbles having a diameter of about 50–100 microns may be more appropriate. In general, if the gas bubbles supplied are too large, they are less likely to attach to the solid particles, whereas if they are too small, the tendency to carry solid particles away from the liquid being removed through the screen in the adjacent region is reduced.

As a result of the invention, the drainage throughput for liquid removal from a suspension has been increased from three to six times compared with conventional screen drainage of a low-solids-content suspension. In general, the solids concentration of the suspensions supplied to the system is preferably in the range from about 0.1% to 5.0% total solids and most preferably from about 0.6% to 2.0% total solids. If the solids concentration is higher, the amount of gas injected at the inlet may be increased.

As a result of the improvement provided by the invention, liquids may be removed efficiently and rapidly from low-solids-content sludges and other suspensions, producing a higher final concentration of the solids, less odor where sludge is involved and a lower flocculation cost since less flocculating polymer may be required and a cheaper polymer may be used. Moreover, a filter press or other dewatering device to which the output is delivered may be operated more efficiently and effectively since the solids content of the material supplied to it is increased. Alternatively, the system feed rate may be increased (i.e., increased throughput may be realized) while maintaining the level of final solids concentration achieved without the improvement.

Although the invention has been described herein with reference to a specific embodiment, many modifications and variations therein will readily occur to those skilled in the art. For example, in place of the porous belt 17, any other porous movable surface extending from the lower portion of the tank 13 to the upper surface of the suspension may be used, such as, for example, a rotating drum. In addition, instead of the gas injection nozzles 28, bubbles may be produced chemically, mechanically, electrically or biologically. Accordingly, all such variations and modifications are included within the intended scope of the invention.

I claim:

1. A method for removing liquid from a suspension comprising supplying suspension to a tank through an inlet region, providing an external tank wall including a movable porous member in communication with the liquid in the tank to permit liquid from the suspension in the tank to pass out of the tank through the porous member and to carry solid material from the suspension out of the tank, and producing bubbles near the bottom of the inlet region to separate solid particles from liquid passing through the lower portion of the porous member, thereby preventing blockage of the porous member.

2. A method according to claim 1 wherein the bubbles are produced by injecting gas under pressure into the inlet region.

3. A method according to claim 2 wherein the gas is supplied to the inlet region at a pressure of about 40–80 psi.

4. A method according to claim 1 wherein the bubbles are produced by supplying liquid saturated with gas to the inlet region.

5. A method according to claim 1 wherein the bubbles have a diameter of about 40–3,000 microns.

6. A method according to claim 1 wherein the total solids content of the suspension supplied to the tank is in the range from about 0.1% to 5.0%.

7. A method according to claim 1 wherein the bubbles are produced in the inlet region at a rate of about 20% to 100% by volume of the volume of the suspension supplied to the inlet region.

8. Apparatus for removing liquid from a suspension comprising a tank, a moving porous member forming an external wall portion of the tank through which liquid passes out of the tank, inlet means for supplying a suspension to the tank, and bubble-producing means for producing bubbles in the suspension supplied to the tank through the inlet means to cause solid particles in the suspension to move away from the adjacent portion of the porous member, thereby reducing accumulation of such particles on the adjacent portion of the porous member and permitting increased flow of liquid from the suspension through the porous member.

9. Apparatus according to claim 8 including discharge means for removing solid material from the porous member after it has been carried thereby out of the suspension in the tank.

10. Apparatus according to claim 8 wherein the bubble-producing means comprises nozzle means for supplying gas or gas-saturated liquid under pressure to the inlet means for the suspension.

11. Apparatus according to claim 8 wherein the porous member comprises a continuous screen supported on drums adjacent to the upper and lower portions of the tank.

* * * * *